United States Patent Office 2,752,229
Patented June 26, 1956

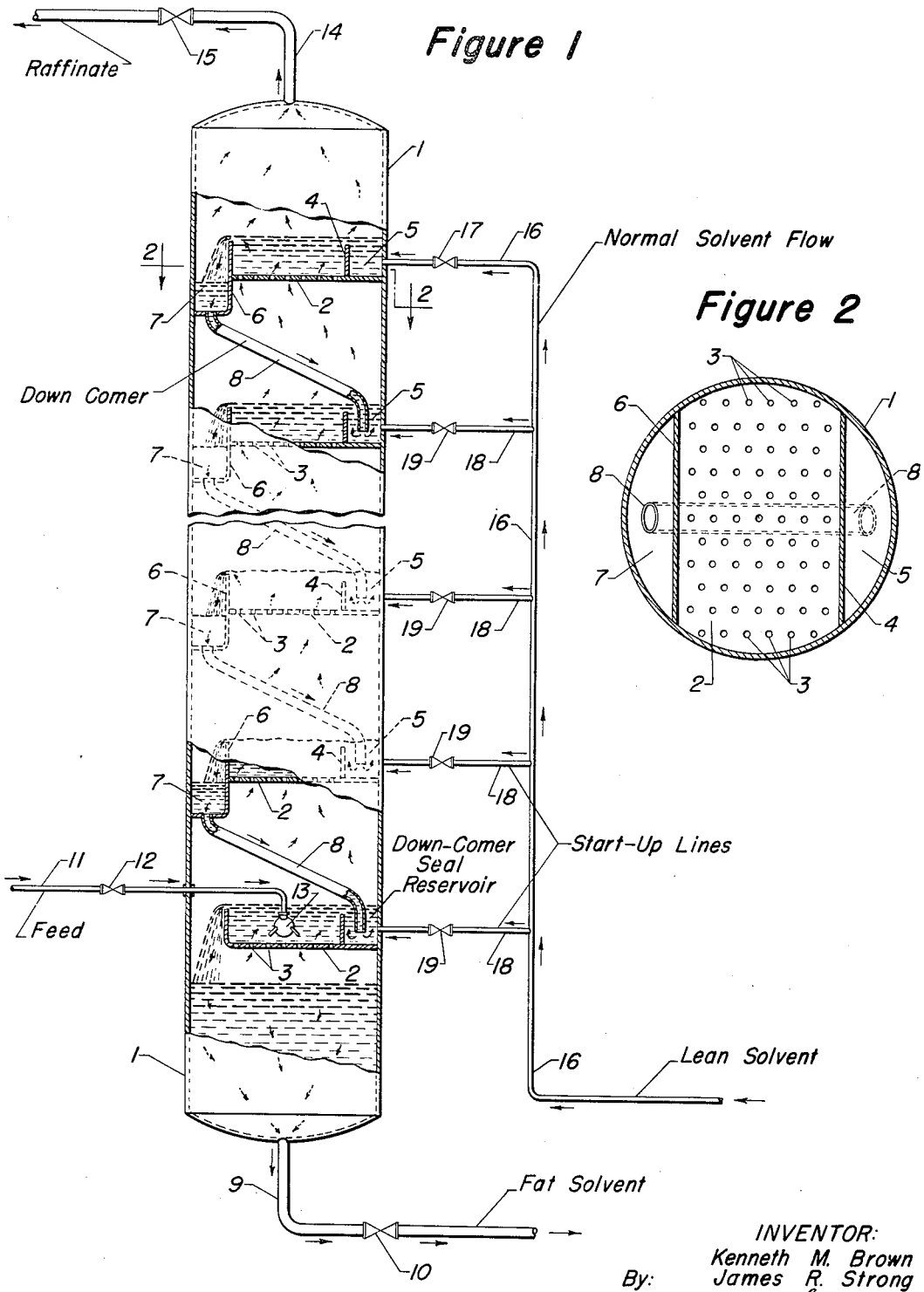
June 26, 1956  K. M. BROWN ET AL  2,752,229
CONTACTING TOWER
Filed Feb. 4, 1953
INVENTOR:
Kenneth M. Brown
James R. Strong
By: Chester J. Giuliani
Philip T. Liggett
ATTORNEYS:

2,752,229

CONTACTING TOWER

Kenneth M. Brown, Hinsdale, Ill., and James R. Strong, Crawfordsville, Ind., assignors to Universal Oil Products Company, Des Plaines, Ill., a corporation of Delaware Application February 4, 1953, Serial No. 335,076

2 Claims. (Cl. 23—270.5)

This invention relates to an improved tower for effecting the countercurrent contacting of fluid streams and particularly adapted for use in connection with liquid-liquid contacting.

In the usual fractionation tower or extraction column, the downcomers extending from one tray to another are vertically disposed, and they are also usually staggered 180° with respect to one another between adjacent decks or trays. Thus, the downflowing liquid medium crosses back and forth across the width of the contacting tower as it descends therethrough. There are certain disadvantages to the use of vertical downcomers, or upcomers, and to the staggered arrangement of the various contacting decks. For example, in placing a column into operation, it is necessary to fill the column with liquid seals at the lower ends of each of the downcomers, or alternatively, await a considerable period of lining-out in order to obtain the liquid seals at each deck. In those instances where the heavier liquid medium is introduced into the tower for effecting the seal, there is required considerably more piping for the staggered arrangement than would be necessary if all of the liquid seal reservoirs were on the same side of a given column. With respect to the vertically positioned downspouts, it should also be noted, particularly in liquid extraction operations, that a vertical downspout promotes greater turbulence and entrainment of liquid mediums, with no aid in eliminating emulsification.

It is a particluar feature of the present invention to provide an improved arrangement and construction in connection with a contacting tower such that all of the distributing decks are constructed and arranged in a similar manner, and sloping downpipe means are utilized between adjacent trays or decks. Thus, from one deck to another, in each case, the downflowing liquid stream passes from a liquid receiving well on a deck to a liquid seal reservoir on a substantially opposing portion of a next lower deck. In other words, all of the liquid receiving wells and the downspout inlets are in alignment on one side of the tower while the downspout outlets and liquid seal reservoirs are in vertical alignment throughout the height of the column on an opposing side thereof. In addition to the advantages of obtaining vertical alignment of the liquid seal reservoirs and the liquid wells, there are other advantages which will be set forth hereinafter.

Briefly, the improved construction for this modified contacting tower embodies, a vertically disposed confined chamber, a plurality of perforate liquid distributing decks extending across the chamber and spaced vertically therein, a liquid seal reservoir on each of the decks, with said reservoirs being maintained in substantially vertical alignment throughout the height of the chamber, liquid overflow weir means and liquid receiving well means opposing the liquid seal reservoir at each of the decks, downpipe means extending from a liquid receiving well of one deck to the liquid seal reservoir of a next lower deck between each of the plurality of vertically spaced decks, fluid inlet means to the lower portion of the chamber, and fluid outlet means from both the upper and lower portions of the chamber.

In a preferable embodiment of the improved tower arrangement, the downspout means from each of the distributing decks is in a sloping position, passing from the bottom of a liquid receiving well of one deck to a point just above and within the zone of the liquid seal reservoir of the next lower deck. The use of the sloping downpipes not only permits the vertical alignment of all of the liquid receiving wells and the vertical alignment of all of the liquid seal reservoirs at the lower ends of each downpipe means, but provides for an improved liquid flow through the downpipe means. In other words, in the operation of a column having countercurrent flow of liquids, such as in a solvent extraction column, a downflowing solvent stream may entrain a portion of the raffinate stream in an emulsion therewith and the extended sloping length of downpipe permits a relatively smooth nonturbulent separation of the two liquid fractions the solvent separating from the raffinate and descending along the lower portion of the downpipe to the next lower deck while the raffinate separating from the solvent flows upwardly along the sloping downpipe means to the deck from which it was entrained.

The identical arrangement of all the liquid distributing trays or decks in a column permits each of the decks to be fabricated, cast, or otherwise constructed in a like manner, which will in turn provide for less cost for patterns, dies and machinery needed in the fabrication of the internal equipment for a given column. The vertical alignment of the liquid receiving seals at the bottom of each of the downpipes provides for a better arrangement of piping to the contacting tower. As briefly mentioned hereinbefore, in providing for the starting-up of a column, a single vertical header with branch piping may now be utilized to introduce the solvent or other heavy medium which flows down through the column, to each of the seal reservoirs for each of the plurality of trays or decks. As a result, the operation of the column can be rapidly established without waiting for the formation of liquid seals at each deck.

The construction and arrangement of the improved column may be better described and set forth by reference to the accompanying drawing and following description thereof.

Figure 1 of the drawing is an elevational view, partially in section, of a simplified embodiment of a contacting tower as provided by the present invention.

Figure 2 of the drawing is a sectional plan view through the column, as indicated by the line 2—2 in Figure 1.

Referring now specifically to the drawing, there is shown a vertically disposed chamber 1 having a plurality of spaced perforate liquid distributing decks or trays 2. Each of these decks or trays is indicated as being provided with a plurality of perforations 3; however, suitable riser openings and bubble caps, or the like, may well be provided at each deck to permit the countercurrent contacting of fluid streams throughout the height of the column. Each of the decks 2 has a weir 4 forming a liquid seal reservoir zone 5. In accordance with one feature of the present invention, each of the decks 2 has the weirs 4 in vertical alignment so that each of the reservoir zones are also in vertical alignment throughout the entire height of the column. Opposing each weir 4 on each deck 2 is a second weir member 6. The latter separates the perforate section of the contacting deck from a liquid receiving well 7, from which the heavier downflowing liquid medium may be passed to a next lower deck.

As indicated in the drawing, the improved tower preferably has a sloping conduit means providing at least one downpipe 8 from each liquid receiving well 7 to the liquid reservoir section 5 of the next lower deck. In operation, the downspout means 8 will provide for the continuous flow of the heavier liquid medium downwardly through the column, from redistributing deck to redistributing deck and to the lower end of the column from which it may be withdrawn.

In a specific example, where a contacting tower of this type is utilized in solvent extraction and the solvent is the heavier medium introduced to the upper portion of the column, then the solvent stream passes in a continuous downward re-crossing flow through the column to the lower deck and to a lower fat solvent outlet 9 having control valve 10. The feed stream is introduced to the lower portion of the column by way of line 11 and control valve 12. Feed is preferably introduced onto the lowermost deck 2 by a liquid distributing nozzle or header 13, as indicated in the present drawing. The cleaned feed stream or raffinate is discharged from the upper end of the column 1 by way of outlet line 14 and control valve 15, while the lean solvent stream is introduced to the upper deck by means of inlet line 16 and control valve 17.

In accordance with another specific embodiment of the present invention, the heavier liquid medium, or solvent medium as indicated by the drawings, is introduced by means of separate connecting lines 18 to each of the superimposed plurality of decks 2 and to the liquid reservoir seal zones 5. This feature permits a heavy liquid seal to be provided at the time of the start-up of the column and in turn permit substantially immediate operation of the column for solvent extraction purposes, or for any given liquid-liquid contacting operation. After the column has been placed in operation, flow control valves 19 provided within each of the cross-connecting lines 18 permit the cut-off of the liquid seal medium and all of the solvent or heavier medium is introduced into the upper end of the column at the uppermost tray, by way of the inlet line 16.

The present type of contacting tower may be utilized in connection with various types of countercurrent liquid contacting operations and it is not intended to limit its use to any specific process. However, by way of example, the present type of tower may be utilized in connection with mercaptan extraction in the treating of a hydrocarbon stream. The hydrocarbon feed stream to be sweetened is charged to the column by way of line 11 and control valve 12 and onto the lowermost deck 2 of the plurality of distributing trays. A caustic soda solution suitable for mercaptan extraction is introduced into the feed line and header line 16 for continuous distribution from the seal zone 5 of the uppermost deck 2 whereby it may descend and contact the hydrocarbon stream throughout the entire height of the chamber 1. The rising hydrocarbon stream passes through the perforations at each deck and mixes with and emulsifies with the solvent medium at each of the plurality of distributing decks. In each case, the weir 6 maintains a level for the heavier caustic solution above the surface of each deck. This caustic solvent solution flows downwardly through the well section 7 and through the downpipe means 8 to a next lower deck. The sloping downpipe means in this type of operation permits the hydrocarbon and caustic solution to effect a separation from any entrained or emulsified material which is carried down through the well and through the downpipe means. The lighter material tends to flow along the upper slanting surface of the downpipe means while the heavier caustic solution flows downwardly along the sloping lower portion of the downpipe means. There is a ready disengagement of the substantially immiscible materials in the sloping downpipe as compared with a vertical pipe. The resulting raffinate stream is discharged from the upper portion of the column by way of the line 14 and the resulting fat solvent stream is discharged from the lower end of the column by way of line 9, as hereinbefore set forth. In a usual commercial processing plant, the caustic solution with the mercaptan is subjected to stripping and a lean solvent solution comprising the stripped caustic solution is returned to the mercaptan column by way of line 16.

It is to be noted in Figure 2 of the drawing that the liquid seal reservoir 5 and the liquid receiving well 7 in each case are formed by substantially straight weir members 4 and 6 respectively; however, the weirs may be curved or angularly placed to provide reservoirs which have a different shape. Also, the downspout means 8 may comprise one or more sloping tubular members and they need not have a round cross-sectional shape to provide a desired downflow of the heavier liquid medium.

We claim as our invention:

1. In a contacting tower for the countercurrent contact of fluid streams, the combination of a plurality of vertically spaced, perforate liquid distributing decks extending across the tower, a weir forming with a portion of the tower wall a liquid seal reservoir on each of said decks at one side of the tower, said reservoirs being in substantially vertical alignment on said side of the tower, a second weir forming with another portion of the tower wall a liquid receiving well at each deck opposite the liquid seal reservoir, said wells being in substantially vertical alignment on the other side of the tower, a sloping conduit extending across the tower between adjacent decks and connecting the liquid receiving well of an upper deck with the liquid seal reservoir of the next lower deck, fluid inlet means to the lower portion of the tower, and fluid outlet means from both the upper and lower portions of the tower.

2. In a contacting tower for the countercurrent contact of fluid streams, the combination of a plurality of vertically spaced, perforate liquid distributing decks extending across the tower, a weir extending upwardly from and across each deck at one side of the tower and forming with a portion of the tower wall vertically aligned liquid seal reservoirs in the tower, a second weir substantially parallel to the first-mentioned weir and extending across and above and below each deck on the other side of the tower and forming with another portion of the tower wall vertically aligned liquid receiving wells opposite said reservoirs in the tower, an inclined liquid downpipe between each pair of adjacent decks connecting the bottom of an upper receiving well with the next lower liquid seal reservoir on the opposite side of the tower, fluid inlet means to the lower portion of the tower, and fluid outlet means from both the upper and lower portions of the tower.

References Cited in the file of this patent

UNITED STATES PATENTS

| | | |
|---|---|---|
| 1,684,489 | Halloran | Sept. 18, 1928 |
| 1,782,735 | MacKenzie | Nov. 25, 1930 |
| 1,808,088 | Urquhart | June 2, 1931 |
| 2,009,347 | Sheldon | July 23, 1935 |